Jan. 31, 1933.  E. A. HAMILTON  1,895,834
COMBINATION IMPLEMENT
Filed May 12, 1931  2 Sheets-Sheet 1
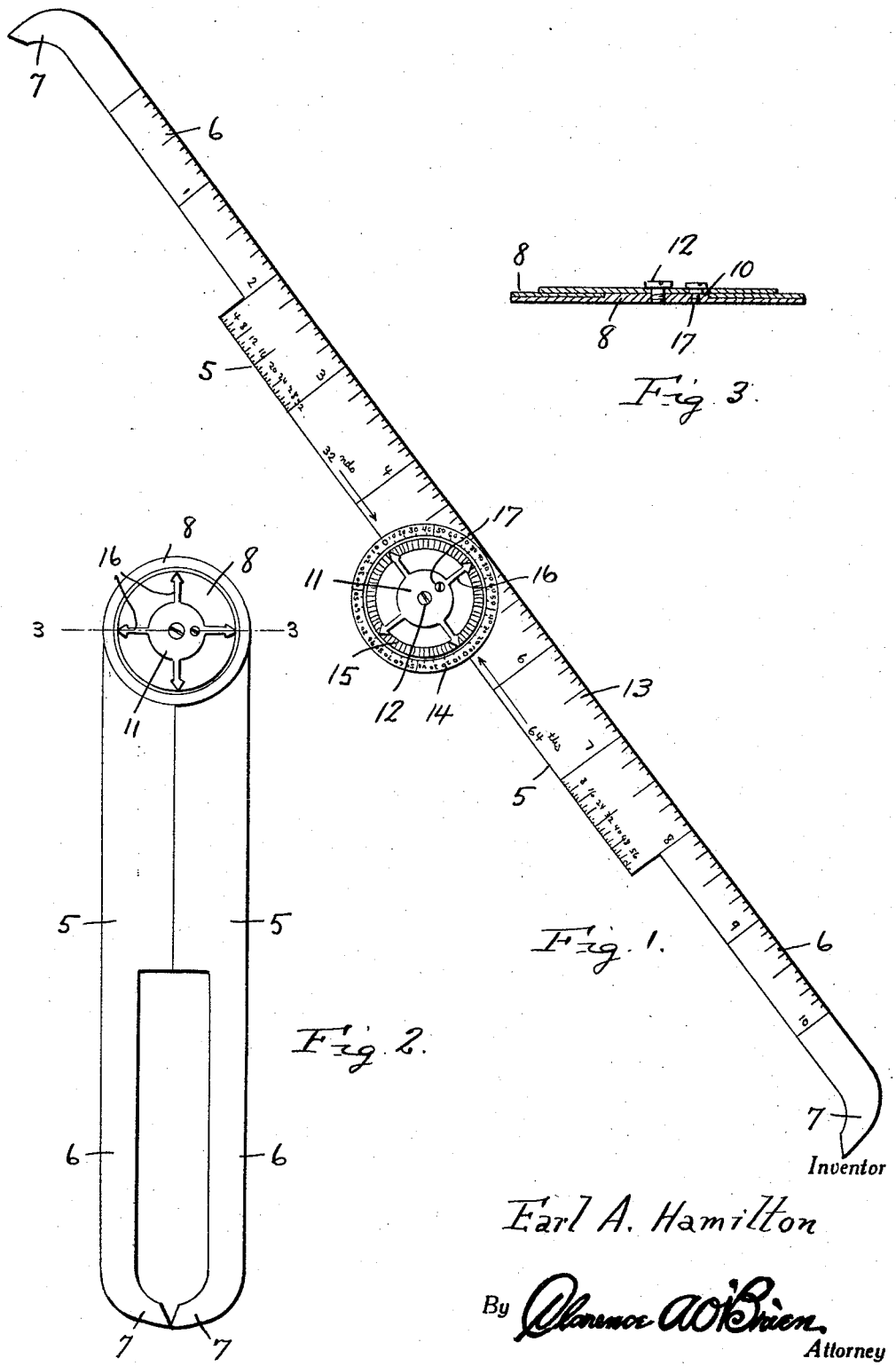
Inventor
Earl A. Hamilton
By Clarence A. O'Brien
Attorney Jan. 31, 1933.  E. A. HAMILTON  1,895,834
COMBINATION IMPLEMENT
Filed May 12, 1931  2 Sheets-Sheet 2

Inventor
Earl A. Hamilton
By Clarence A. O'Brien
Attorney

Patented Jan. 31, 1933

1,895,834

UNITED STATES PATENT OFFICE

EARL ALBERT HAMILTON, OF ST. LOUIS, MISSOURI

COMBINATION IMPLEMENT

Application filed May 12, 1931. Serial No. 536,838.

This invention relates to a combination implement, and the primary object of this invention is to provide in a unitary structure different instruments such as calipers, square protractor and rule.

A still further object of the invention is to provide an instrument of the character described, which can be cheaply manufactured, used as an advertising medium, and which will also be thoroughly reliable and efficient in use for the purposes indicated.

Other objects and advantages of the invention will become apparent from a study of the following description, taken in connection with the accompanying drawings wherein:

Figure 1 is a plan view of the implement in position for use as a rule.

Figure 2 is a plan view of the device with the legs thereof disposed in parallel contacting relation.

Figure 3 is a sectional view taken substantially on the line 3—3 of Figure 2.

Figure 6:
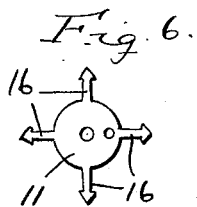
Figure 6 is a plan view of a pointer carrying disk.
Figure 4:
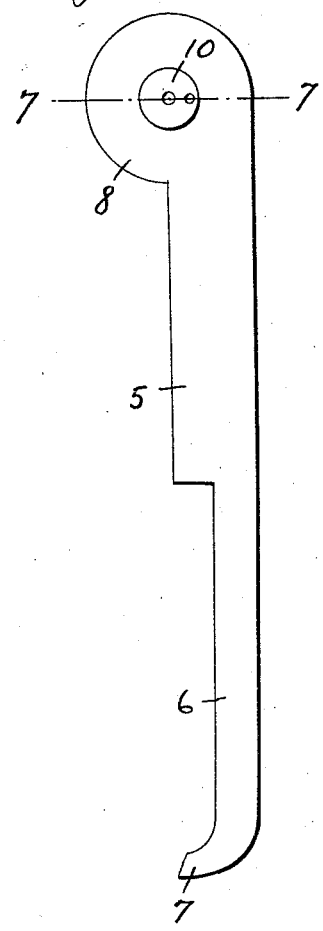
Figure 4 is a plan view of one of the legs of the device.
Figure 5:
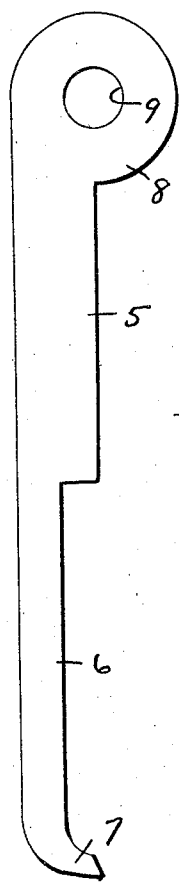
Figure 5 is a similar view of the other leg of the device.
Figure 7:
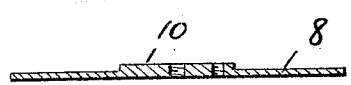
Figure 7 is a sectional view taken substantially on the line 7—7 of Figure 4.

With reference more in detail to the drawings, it will be seen that 5 indicates the legs of the device, each of which at one end, is provided with a longitudinal relatively narrow extension to provide a divider point 6 terminating at its free end with an inwardly directed lateral extension forming a caliper-point 7.

Each of the legs 5 at its inner end is provided with a slightly offset disk 8, and these disks are arranged in overlapping relation. One of the disks is provided with an aperture 9 for accommodating a hub 10 formed on the other of said disks whereby to provide a pivotal connection between the legs at said inner end of the legs.

The disks provided with the aperture 9 is confined on the disk provided with the hub 10 between the last referred to disk, and a circular plate 11. The pivot 12 passes entirely through the plate 11 and the hub 10 thus providing for an efficient joint.

On corresponding faces of the legs 5 I provide a scale 13 graduated to inches and fractions thereof, the scale continuing along corresponding faces of the points 6. 14 denotes a circular scale on the apertured disk 8. The scale 14 is suitably graduated and cooperates with the scale 15 provided on the disk 8 provided with the aperture 9.

The plate 11 has radiating therefrom a circular series of pointers 16 adapted to be read against the scales 14 and 15 whereby the points may be accurately set at any desired distance apart when using the device as calipers. The plate 11 is held in position through the medium of a set screw 17 extending therethrough and engageable with an aperture therefor provided eccentrically in the hub 10.

The plate 11 and pointers 16 are preferably formed of metal or other suitable resilient material, and the space between the hub carrying disk and the pointer 16 is such, that the pointers 16 will frictionally bear against the apertured disk 8 for yieldably retaining the disks against relative rotative movement.

The many uses to which a combined implement of this character may be used is thought apparent from the foregoing description, taken in connection with the accompanying drawings and accordingly a more detailed description thereof is thought unnecessary.

Even though I have herein shown and described the preferred embodiment of the invention, it is to be understood that the same is susceptible of changes, modifications and improvements coming within the scope of the appended claims.

Having thus described my invention, what I claim as new is:

1. An implement of the character described comprising a pair of legs provided at corresponding ends with disks, one of said disks provided with a hub, and the other of said disks provided with an aperture through which said hub extends, one of said disks being provided with an annular caliper scale, and a plate on said disk and rotatable relative thereto, and radial pointers carried by said plate and adapted to be read against said scales.

2. In a device of the class described, a leg having one end portion thereof formed with a disc having a centrally located upstanding hub, a second leg having a disc overlying said first named disc and being provided with a centrally located aperture receiving said hub, a plate secured at spaced points to said hub and overlying the second named disc and having frictional contact therewith, said second-named disc being provided with an annular scale, said plate being provided with a plurality of radial pointers cooperating with said scale to indicate the positions of the legs with respect to each other.

In testimony whereof I affix my signature.

EARL ALBERT HAMILTON.